United States Patent Office 3,316,184
Patented Apr. 25, 1967

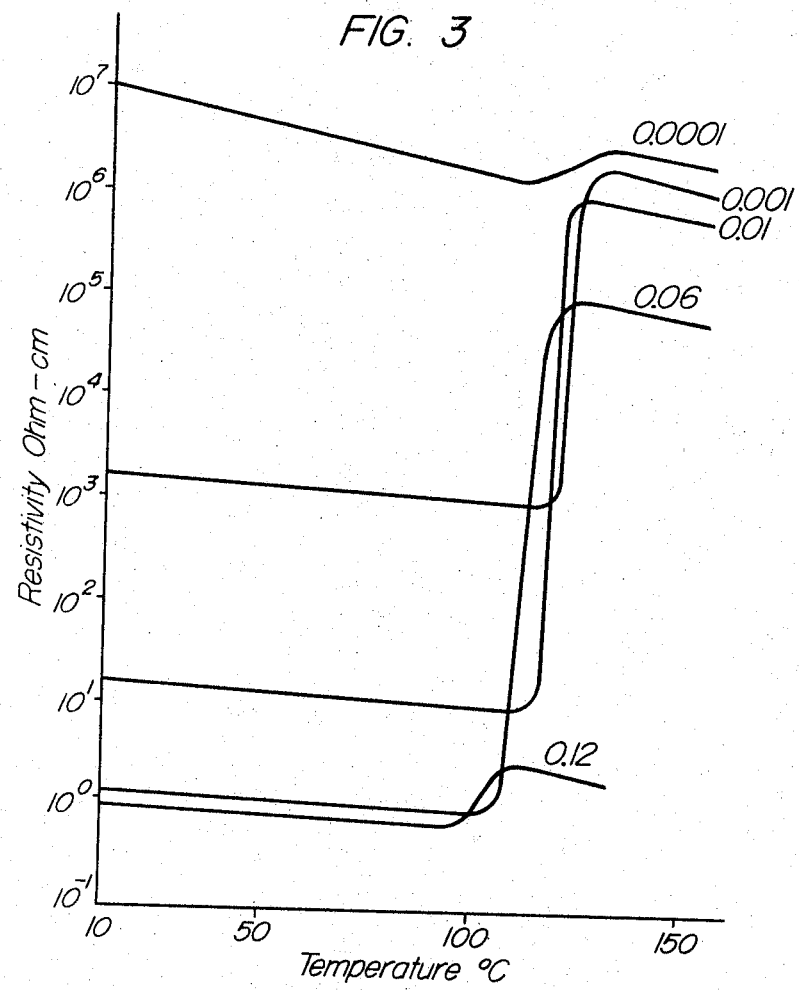

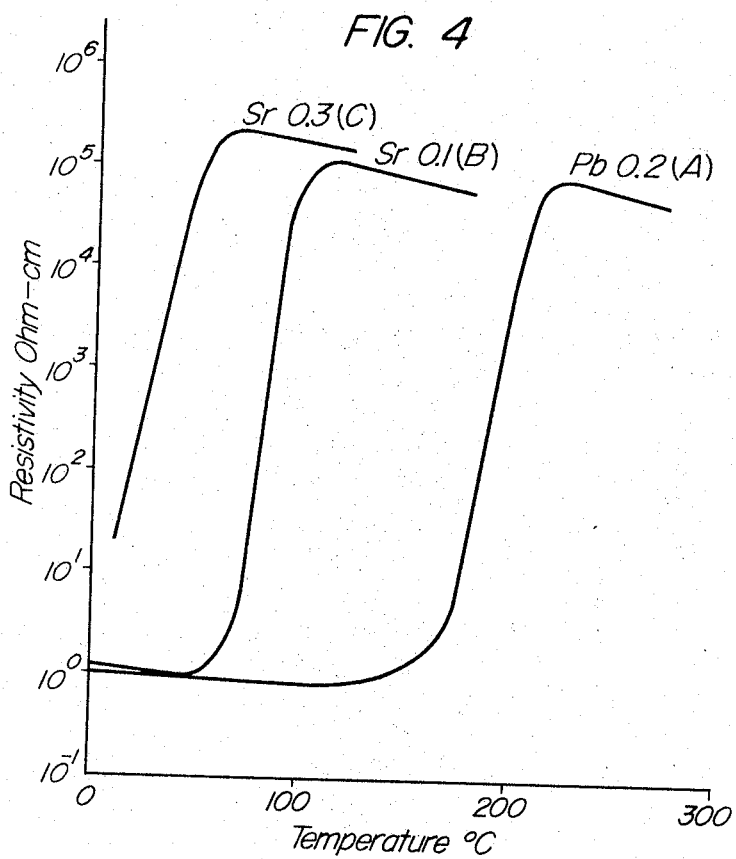

3,316,184
BARIUM TITANATE CERAMIC COMPOSITION
Kaneomi Nagase, Kyoto, Hiromitsu Taki, Sakai-shi, and Tsuneharu Nitta, Osaka, Japan, assignors to Matsushita Electric Industrial Co., Ltd., Osaka, Japan, a corporation of Japan
Filed July 30, 1965, Ser. No. 476,021
Claims priority, application Japan, May 9, 1962, 37/18,937; Nov. 19, 1962, 37/51,758; Feb. 20, 1963, 38/8,957; Mar. 13, 1963, 38/14,396
5 Claims. (Cl. 252—520)

This application is a continuation-in-part of our pending application Ser. No. 278,533, filed May 7, 1963, now abandoned.

This invention relates to semiconductive ceramic compositions having a high positive temperature coefficient of electrical resistance (PTC).

There have been many prior disclosures about the semiconductive PTC materials consisting of barium titanate doped with a small amount of metal oxide such as rare earth oxides. In a prior art, PTC barium titanate is obtained only by valency control principle reported by Verway. The PTC barium titanate in a prior art needed a severe control in composition for achievement of small tolerance of resistivity and PTC because the resistivity and PTC highly depend on its principal composition and an amount of doped metal oxide such as rare earth oxide. Therefore, starting materials, particularly doped metal oxides, must be of a highly purified form. Furthermore, the calcination process is usually required for making the prior ceramic materials. Important factors in preparing PTC materials are a smaller tolerance of resistivity, a uniform and high density, uniform grain growth, excellent aging characteristics, and easy control of resistivity at all resistance levels. Furthermore, it is desirable that these PTC ceramic materials are characterized by a very abrupt rise in resistance in a range of a few degrees of temperature from a relatively constant resistance to an extremely high resistance.

It has been discovered, according to the present invention, that silver oxide makes a solid solution with barium titanate. The solid solution exhibits the PTC characteristic which is much less depending on its composition than that of a prior PTC material. Further we have discovered that the resistivity of the present composition is easily controlled, by adding silver oxide, at all resistance levels, and has good similarity in PTC characteristics although the amount of silver oxide is changed. It is also a discovery of the present invention that an addition of silver oxide results in an improvement in the sintered density and a uniform grain growth of the sintered material, which are desirable for high stability of electrical properties with time. We have also found that the replacement of silver oxide in the present composition by other oxides such as lithium oxide does not achieve the desirable characteristics mentioned above.

An object of the invention is to provide novel semiconductive PTC ceramic compositions satisfying the above various requirements.

A further object of the invention is to provide a simple and economic method of making semiconductive ceramic compositions so that the member will exhibit excellent aging characteristics, a uniform ceramic texture, and a small tolerance of resistivity to variation of composition.

Other objects of the invention will in part be obvious and will in part appear hereinafter.

For a better understanding of the nature and scope of the invention, reference should be had to the following drawings, in which:

FIG. 3 is a graph plotting resistance against temperature of a body of composition in accordance with this invention.

FIG. 4 is a graph plotting resistance against temperature of a body of composition in accordance with this invention.

In accordance with the present invention, it has been discovered that certain ceramic materials may be composed essentially of (A) 1 mol of an oxide selected from the group consisting of titanium oxide, titanium zirconium oxide and titanium tin oxide, of (B) a total of 1 mol (a) from 0.9999 to 0.915 mol of an oxide from the group consisting of barium oxide, barium strontium oxide and barium lead oxide and (b) from 0.0001 to 0.085 of silver oxide and of (C) less than 5.5 mol percent of titanium oxide added in excess of stoichiometry.

Figure 1:
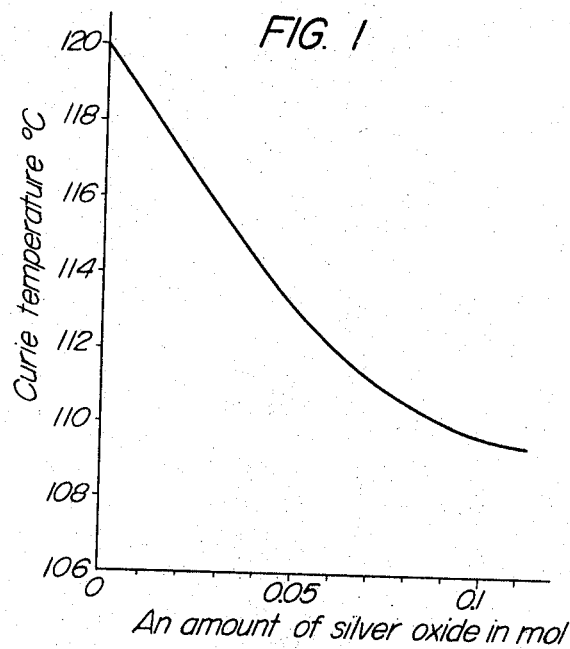
FIG. 1 is a graph plotting Curie-temperature against composition of a body of composition in accordance with this invention.
Figure 5:
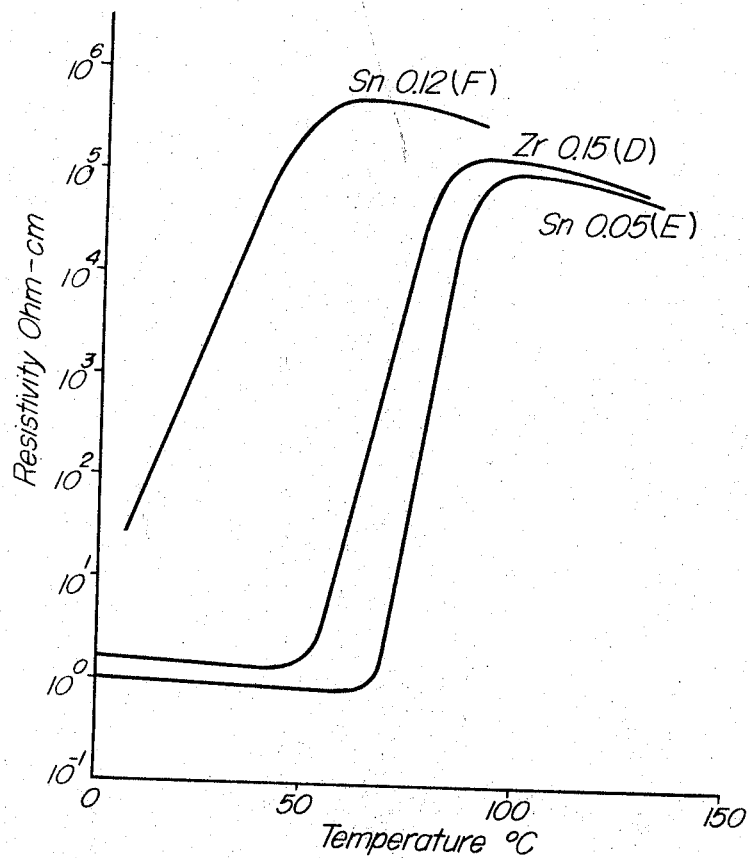
FIG. 5 is a graph plotting resistance against temperature of a body of composition in accordance with this invention.

These components are intimately and homogeneously combined and fired in accordance with a schedule to be set forth hereinafter for production of a fired ceramic body which will not only exhibit (1) a lower room temperature resistivity and a sudden increase in resistance within a selected range of temperature from 10,000 to 100,000 times, but also (2) excellent aging characteristics resulting from a uniform ceramic texture. These desirable properties are obtained by adding a small amount of silver oxide. Added silver ions dissolved in barium titanate and partially substituted for barium ions in the crystal lattice, as shown in FIG. 1 which results in the Curie temperature shifting to lower temperature with an increase in the added amount of silver oxide.

Figure 2:
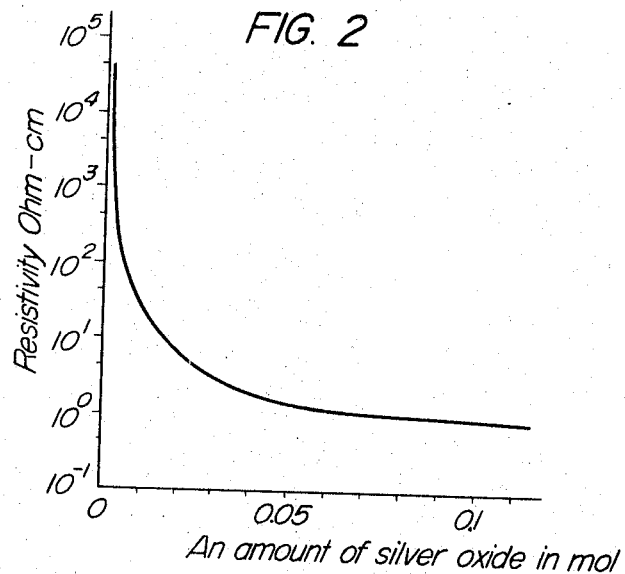
FIG. 2 is a graph plotting resistance against composition of a body of composition in accordance with this invention.

FIG. 2 illustrates a variation of resistance at room temperature against the amount of silver oxide in compositions. From the curve of FIG. 2, it is found that the resistance decreases with increasing amounts of silver oxide. However, semiconductive characteristics can hardly be obtained in the ceramic materials of solid solution of less than 0.0001 mol of silver oxide in barium titanate. In the ceramic materials of solid solutions of more than 0.085 mol of silver oxide in barium titanate, metallic silver is formed in part. Therefore, such compositions hardly exhibit a positive temperature coefficient of electrical resistance. Moreover, the solid solutions of silver oxide in barium titanate easily sinter to form dense ceramic bodies having a uniform grain growth and substantially uniform electrical characteristics. Also such ceramic bodies are desirable as materials of a barrier-layer capacitor which exhibits a large capacitance per unit area and electrical stability with time.

It has been known that titanium oxide added in excess of stoichiometry results in dense ceramic bodies and a uniform ceramic texture. In the ceramic compositions of this invention, the excess of titanium oxide promotes the preferred effect in conjunction with adding silver oxide. Excellent results can be obtained by the addition of less than 5.5 mol percent of titanium oxide in excess of stoichiometry. The addition of more than 5.5 mol percent of titanium oxide causes an abnormal grain growth so that the ceramic becomes nonhomogeneous and brittle. In the solid solution of silver oxide in barium titanate, barium is substituted partly by strontium or lead and titanium is substituted partly by zirconium or tin. The temperature at which the resistivity rapidly increases is shifted with the substitutions.

In preparing the semiconductive materials of the present invention, the titanium oxide will be employed as such anatase. The barium oxide may be introduced as barium carbonate. The strontium oxide and the lead oxide may be added to barium carbonate. The zirconium oxide and the tin oxide may be added to titanium oxide. The silver oxide may be introduced as silver oxide. The correct proportions of titanium oxide, barium carbonate and silver oxide, for example, are wet mixed with water in a rubber lining pot mill using agate pebbles. Ball milling times of 10 to 24 hours have given an intimate homogeneous mixture. The resultant mixture is dried, for example, by heating to 100° C. The resultant powder may be admixed with a small amount of an organic binder such, for example, as a dilute solution of polyvinyl alcohol. The organic binder enables the powder to be compacted, in a pellet forming machine, into a pellet of a size and shape desired. Good results have been obtained when pressures of from about 750 to 1,000 kg./cm.$^2$ were applied to the powder. The pressed pellets are then first sintered in an inert atmosphere, for example, nitrogen gas, at a temperature of from 1300° to 1450° C., while supported on a stabilized zirconia powder. Thereafter, the sintered bodies are heat treated in an oxidizing atmosphere such as air, at a temperature of 1150° C., for period of the order of 1 hour. These materials are then treated to apply to spaced portions thereof an electrode material to make ohmic contact. A coating method employing an electrode material, for example, indium gallium alloy, is satisfactory. The following examples illustrated the practice of the invention.

*Example 1*

Starting materials are barium carbonate, titanium oxide, and silver oxide. These raw materials are admixed in the ceramic compositions, silver barium titanate, comprising from 0.0001 to 0.085 mol of silver oxide, from 0.9999 to 0.915 mol of barium oxide and 1 mol of titanium oxide. These ingredients are wet mixed in water in a rubber lining ball mill for 24 hours. The resulting slurry is allowed to settle and the supernatant water is evaporated and the resulting mud is then dried at 100° C. in air. The powder is admixed with an emulsion of polyvinyl alcohol in a proportion of 100 grams of the powder to 8 cc. of a 6% aqueous emulsion of polyvinyl alcohol. The powder mixture is then pressed at a pressure of 1,000 kg./cm.$^2$ into a disc pellet. The pellet is sintered in a nitrogen atmosphere at 1360° C. for 2 hours, while supported on a stabilized zirconia powder. The sintered pellet is then heat treated in air at 1150° C. for 1 hour. The resulting sintered disc body is of 5 mm. diameter and 1 mm. thick. The resulting materials are then coated at both ends of disc with 50% indium–50% gallium alloy.

The electrical characteristics of the semiconductive ceramic materials obtained by said process are shown in FIG. 3. FIG. 3 illustrates a variation of resistivity temperature characteristics with amount of the silver oxide in the composition of the present invention. At room temperature the resistivity decreases with an increase in mol proportion of the silver oxide. Electrical resistances abruptly increases in a resistance increasing ratio of 10,000 to 100,000 at near 120° C. in a few degrees of temperature. By controlling the amount of the silver oxide, the resistivity is variable at any resistance level from 1 ohm-cm. to 1,000 ohm-cms. The materials show substantially uniform electrical characteristics, a high density of less than 1 percent of porosity and a uniform ceramic texture of from 1 to 3$\mu$ of grain size. Furthermore, the materials exhibt good againg characteristics.

*Example 2*

FIG. 4 illustrates the electrical resistivity of the ceramic materials which is produced by following the procedure set forth in Example 1. Curve A is determined on a ceramic material, comprising 0.06 mol silver oxide, 0.20 mol lead oxide, 0.74 mol barium oxide and 1 mol titanium oxide. The resistivity at 20° C. is 1 ohm-cm. The resistivity increases abruptly at approximately 180° C. The resistivity at 200° C. is 8×10$^4$ ohm-cms. Curve B is obtained by testing the composition; 0.06 mol silver oxide, 0.1 mol strontium oxide, 0.84 mol barium oxide and 1 mol titanium oxide. The resistivity at 60° C. is about 1 ohm-cm. The resistivity at 70° C. is 1×10$^5$ ohm-cms. In the curve C of the composition which 0.3 mol strontium substitutes partly for barium, the resistivity is 1×10$^2$ ohm-cms. at 20° C. and is 2.5×10$^5$ ohm-cms. at 40° C.

*Example 3*

Ceramic materials are prepared by following the process of Example 1 and employing the following compositions: 0.06 mol silver oxide, 0.94 mol barium oxide, 0.15 mol zirconium oxide and 0.85 mol titanium oxide (curve D), 0.06 mol silver oxide, 0.94 mol barium oxide, 0.05 mol tin oxide and 0.95 mol titanium oxide (curve E) and 0.06 mol silver oxide, 0.94 mol barium oxide, 0.12 mol tin oxide and 0.88 mol titanium oxide (curve F). From curve D, it will be noted that at about 50° C. there is a sudden increase in resistivity. Curve E and curve F also indicate that the temperature at which resistance rises abruptly is shifted to lower temperature.

It will be understood that the present specification and drawing are only illustrative and not limiting.

What is claimed is:

1. A semiconductive ceramic material formed from a solid solution in perovskite structure having a positive temperature coefficient of electrical resistivity, and consisting essentially of 1.00 mol of titanium dioxide, and of a total of one mol of (a) up to 0.9999 mol of barium oxide and (b) from 0.0001 to 0.085 mol of silver oxide.

2. A semiconductive ceramic material formed from a solid solution of perovskite structure, having a positive temperature coefficient of electrical resistivity, and consisting essentially of 1.00 mol of titanium dioxide, and of a total of one mol of (a) up to 0.9899 mol of barium oxide, (b) from 0.01 to 0.25 mol of lead oxide, and (c) from 0.0001 to 0.085 mol of silver oxide.

3. A semiconductive ceramic material formed from a solid solution in perovskite structure, having a positive temperature coefficient of electrical resistivity, and consisting essentially of 1.00 mol of titanium dioxide, and of a total of one mol of (a) up to 0.9899 mol of barium oxide, (b) from 0.01 to 0.30 mol of strontium oxide, and (c) from 0.0001 to 0.085 mol of silver oxide.

4. A semiconductive ceramic material formed from a solid solution in perovskite structure, having a positive temperature coefficient of electrical resistivity, and consisting essentially of a total of one mol of (a) up to 0.99 mol of titanium dioxide and (b) from 0.01 to 0.30 mol of zirconium dioxide, and of a total of one mol of (c) up to 0.9999 mol of barium oxide and (d) from 0.0001 to 0.085 mol of silver oxide.

5. A semiconductive ceramic material formed from a solid solution in perovskite structure, having a positive temperature coefficient of electrical resistivity, and consisting essentially of a total of one mol of (a) up to 0.99 mol of titanium dioxide, (b) from 0.01 to 0.30 mol of tin dioxide, and of a total of one mol of (c) up to 0.9999 mol of barium oxide and (d) from 0.0001 to 0.085 mol of silver oxide.

References Cited by the Examiner

UNITED STATES PATENTS

| | | | |
|---|---|---|---|
| 2,947,698 | 8/1960 | Holtzberg | 252—62.9 |
| 2,981,699 | 3/1961 | Ichikawa | 252—520 |
| 2,989,483 | 6/1961 | Miller | 252—63.2 |
| 3,056,938 | 10/1962 | Pappis et al. | 252—520 X |

LEON D. ROSDOL, *Primary Examiner.*

J. D. WELSH, *Assistant Examiner.*